(12) United States Patent
Khan (10) Patent No.: US 8,824,960 B2
(45) Date of Patent: Sep. 2, 2014

(54) MOBILE WIRELESS COMMUNICATIONS DEVICE TO AUTHENTICATE A REMOVABLE POWER SOURCE VIA NFC COMMUNICATIONS AND ASSOCIATED METHODS

(75) Inventor: Gabriel Deen Khan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 336 days.

(21) Appl. No.: 13/161,711

(22) Filed: Jun. 16, 2011

(65) Prior Publication Data

US 2012/0322369 A1 Dec. 20, 2012

(51) Int. Cl.
*H04B 5/00* (2006.01)

(52) U.S. Cl.
USPC .................. 455/41.1; 455/41.2; 370/106

(58) Field of Classification Search
CPC ........................................ H04W 12/06
See application file for complete search history.

(56) References Cited

U.S. PATENT DOCUMENTS

| | | | |
|---|---|---|---|
| 7,683,571 B2 | 3/2010 | Takamatsu et al. | 320/106 |
| 7,697,957 B2 | 4/2010 | Pattenden et al. | 361/56 |
| 2002/0041175 A1* | 4/2002 | Lauper et al. | 320/106 |
| 2005/0084722 A1* | 4/2005 | Bullock et al. | 429/22 |
| 2006/0179473 A1* | 8/2006 | Innami et al. | 726/2 |
| 2007/0155443 A1 | 7/2007 | Cheon et al. | 455/572 |
| 2008/0037779 A1* | 2/2008 | Seman et al. | 380/46 |
| 2010/0293613 A1 | 11/2010 | Hum | |
| 2012/0226912 A1* | 9/2012 | King | 713/183 |
| 2012/0252411 A1* | 10/2012 | Johnsgard et al. | 455/411 |

FOREIGN PATENT DOCUMENTS

| | | |
|---|---|---|
| EP | 1804393 | 7/2007 |
| EP | 2219353 | 8/2010 |
| WO | 0079771 | 12/2000 |
| WO | WO 2012151652 A1 * | 11/2012 |

OTHER PUBLICATIONS http://www.powermanagementdesignline.com/172303447;jsessionid=Q3XWLNCDRYLGKQSNDLQCKHSCJUNN2JVN?printableArticle=true Printed Jun. 14, 2011.
"Nokia 1200/1208 User's Guide" http://nds1.nokia.com/files/support/apac/phones/guides/Nokia_1200_1208_APAC_UG_en.pdf.
Taofik Ghanname "How NFC can speed Bluetooth transactions—today" http://www.eetimes.com/design/communications-design/4012606/How-NFC-can-to-speed-Bluetooth-transactions-151-today Printed Jun. 14, 2011.

* cited by examiner

*Primary Examiner* — Fayyaz Alam
*Assistant Examiner* — Mohammed Rachedine
(74) *Attorney, Agent, or Firm* — Allen, Dyer, Doppelt, Milbrath & Gilchrist, P.A.

(57) ABSTRACT

A mobile wireless communications device includes a housing carrying a wireless transceiver and a removable power source. The removable power source includes a first Near Field Communications (NFC) circuit. A second NFC circuit is carried by the housing and is configured to authenticate the removable power source based upon communications the said first NFC circuit.

17 Claims, 5 Drawing Sheets

MOBILE WIRELESS COMMUNICATIONS DEVICE TO AUTHENTICATE A REMOVABLE POWER SOURCE VIA NFC COMMUNICATIONS AND ASSOCIATED METHODS

TECHNICAL FIELD

The present disclosure relates to the field of mobile wireless communications devices, and, more particularly, to mobile wireless communications devices including Near Field Communications (NFC) circuits.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices also allow users to send and receive electronic mail (e-mail) messages wirelessly and access the Internet via a cellular network and/or a wireless local area network (WLAN), for example. In addition, these devices may allow users to send Short Messaging Service (SMS) messages, Personal Identification Number (PIN) messages, and instant messages.

Given the wide variety of functions now performed by such mobile wireless communications devices, power consumption has become an issue. The typical mobile wireless communications device is now used throughout the day, and not merely for making and receiving voice calls. As such, manufacturers have invested considerable money in the design and manufacture of batteries for their mobile wireless communications devices, and may like a way to prevent batteries manufactured by third parties from working with their devices, for a variety of reasons. For example, many mobile wireless communications devices come with a warranty, and a poorly designed third party battery may damage the device. Likewise, a poorly designed third party battery may not allow the device to operate optimally, decreasing a customer's satisfaction with the device.

Consequently, a mobile wireless communications device able to authenticate a battery installed therein is desirable.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a mobile wireless communications device may comprise a housing, a wireless transceiver carried by the housing, and a removable power source capable of being carried by the housing. The removable power source may comprise a first Near Field Communications (NFC) circuit. A second NFC circuit may be carried by the housing, and may be configured to authenticate the removable power source based upon communication with the first NFC circuit.

A processor may be carried by the housing and may be coupled to the second NFC circuit. The processor may be configured to switch from a locked state to an unlocked state based upon a successful authentication of the removable power source. In addition, the processor may be configured to switch from an unlocked state to a locked state based upon an unsuccessful authentication of the removable power source.

In some applications, the processor may be configured to cooperate with the wireless transceiver to place an emergency call when the processor is switched to a locked state. A display may be carried by the housing, and the processor may be configured to cooperate with the display to display an error message when switched to a locked state.

The removable power source and the processor may exchange handshake communications. The handshake communications may comprise a security code.

There may be an electrical conduction communication path between a first processor coupled to the first NFC circuit and a second processor carried by the housing for additional authentication of the removable power source. The housing may define a cavity capable of receiving the removable power source, and the removable power source may be removably positioned within the cavity.

The removable power source may further comprise a sealed battery casing containing the first NFC circuit, and at least one rechargeable battery cell carried by the sealed battery casing.

Another aspect is directed to a removable power source capable of powering a mobile wireless communications device. The removable power source may include a first Near Field Communications (NFC) circuit configured to authenticate the mobile wireless communications device based upon communication with a second NFC circuit thereof. The removable power source may comprise a battery, in some applications. In further applications, the removable power source may comprise a fuel cell.

A method aspect is directed to a method on a mobile wireless communications device having a housing carrying a wireless transceiver and a removable power source, the removable power source comprising a first Near Field Communications (NFC) circuit. The method may comprise authenticating the removable power source based upon communications between a second NFC circuit carried by the housing and the first NFC circuit.

Figure 1:
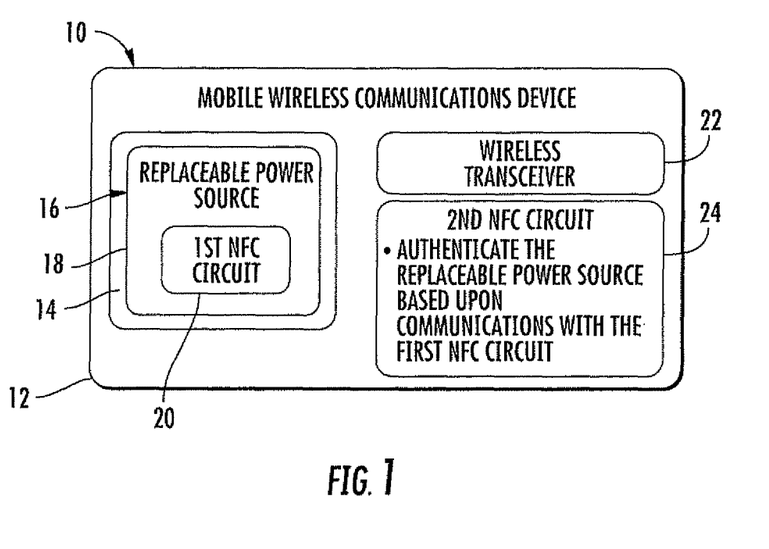
FIG. 1 is a schematic block diagram of a mobile wireless communications device in accordance with the present disclosure.

With initial reference to FIG. 1, a mobile wireless communications device 10 in accordance with the present disclosure is now described. Example mobile wireless communications devices may comprise portable or personal media players (e.g., MP3 players, video players, electronic book readers, etc.), remote controls (e.g., television or stereo remotes, etc.), portable gaming devices, portable or mobile telephones, smartphones, tablet computers, laptop computers, etc. The mobile wireless communications device 10 includes a housing 12 that defines a removable power source receiving cavity 14. A removable power source 16 is removably positioned within the removable power source receiving cavity 14. The removable power source 16 may be a rechargeable battery, a fuel cell or any other form of energy storage or generation system, for example, and includes a first near field communications (NFC) circuit 20.

The mobile wireless communications device 10 also includes a wireless transceiver 22, such as a cellular transceiver, and a second NFC circuit 24. The second NFC circuit 24 is configured to authenticate the removable power source 16 based upon communications with the first NFC circuit 20.

Authenticating the removable power source 16 advantageously allows the manufacturer of the mobile wireless communications device 10 to ensure that the correct removable power source 16 is used. For example, there may be removable power sources 16 that fit within the removable power source receiving cavity 14, but do not provide the proper current or voltage and may degrade the performance or the operability of the mobile wireless communications device 10. Authentication would help prevent the incorrect removable power source being used. In addition, authentication helps prevent unapproved and potentially dangerous or harmful removable power sources from being used.

NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters, typically 4 cm or less, but other suitable versions of near-field communication which may have different operating frequencies, effective ranges, etc., for example, may also be used.

Figure 2:
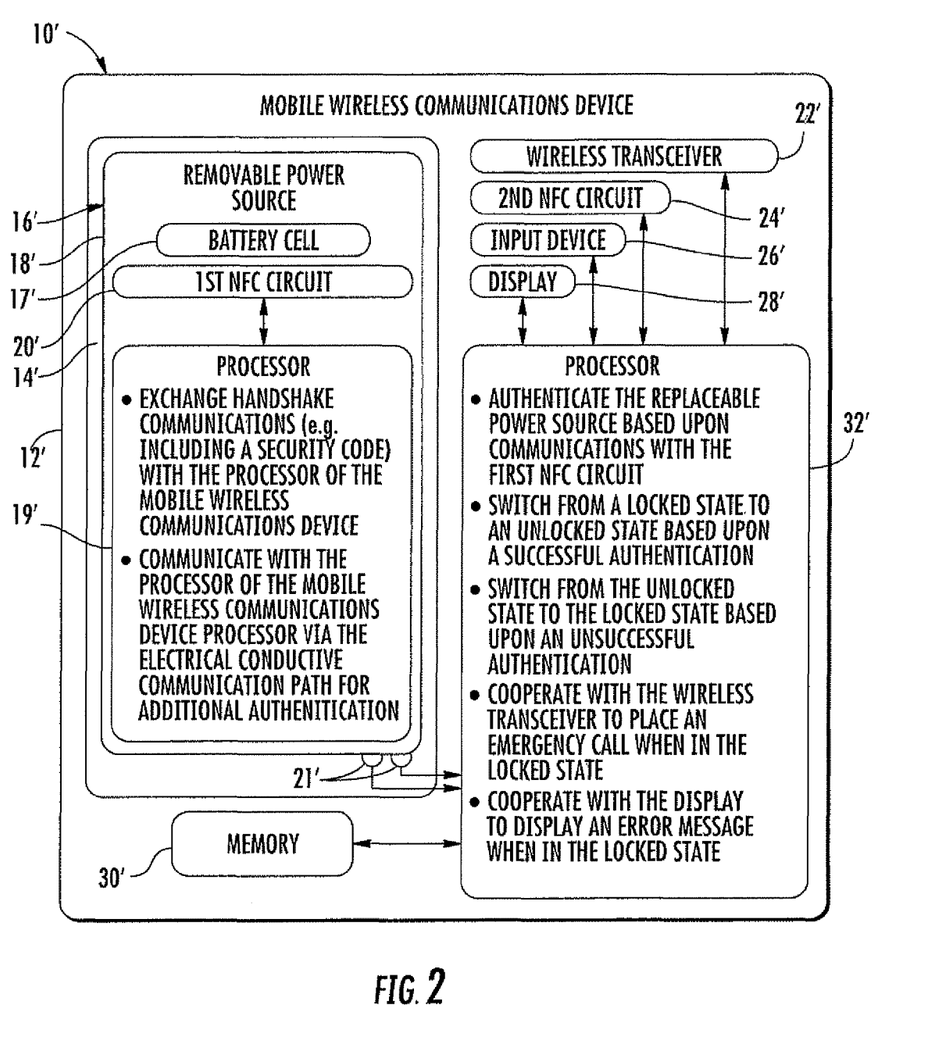
FIG. 2 is a schematic block diagram of a more detailed embodiment of a mobile wireless communications device in accordance with the present disclosure.

Referring now to FIG. 2, a more detailed embodiment of the mobile wireless communications device 10' is now described. Here, the removable power source 18' includes at least one battery cell 17', and a processor 19' coupled to the first NFC circuit 20'. The battery cell 17' may comprise a rechargeable lithium-ion cell, for example.

The mobile wireless communications device 10' also includes a wireless transceiver 22', input device 25', display 28', and memory 30' coupled to a processor 32'. The memory 30' may include both volatile portions, such as Random Access Memory (RAM), and non-volatile portions, such as Flash RAM, in some applications. The display 28' is typically an Organic Light Emitting Diode (OLED) display, but may also be a Liquid Crystal Display (LCD) or other suitable display. The input device 26' may be a keyboard, touch sensitive pad, trackball, or thumbwheel, for example. In addition, the input device 26' may include any number of separate components, such as a keyboard and a touch sensitive pad. Further, it should be appreciated that the display 28' may be a touch sensitive display and may therefore act as at least a portion of the input device 26'. The wireless transceiver 22' may include a cellular transceiver or a WLAN transceiver, for example, and the processor 32' may cooperate with the wireless transceiver for wireless communications.

The processor 32' authenticates the removable power source 16' based upon communications between the second NFC circuit 24' and first NFC circuit 20'. These NFC communications may be handshaking communications and may include the exchange of a security code. For example, during these NFC communications, the processor 19' may send the security code, via the first NFC circuit 20', to the processor 32'. The processor 32' compares the security code to a stored code to authenticate the removable power source 16'.

The processor 32' is switchable between a locked state and an unlocked state. Generally, when operating in the unlocked state, the processor 32' performs a variety of device functions. However, when operating in the locked state, the processor 32' performs merely a limited number of device functions. For example, when in the locked state, the processor 32' may display an error message on the display 28', and may not perform other device functions regardless of the input received via the input device 26'.

Additionally, in some applications when in the locked state, the processor 32' may permit the placement of an emergency call (i.e. 911) via the wireless transceiver 22'. The processor 32' may not perform other device functions, however, such as messaging and wireless communications, other than placing the emergency call when in the locked state.

The processor 32' may switch from the unlocked state to the locked state based upon an unsuccessful authentication, and may switch from the locked state to the unlocked state based upon a successful authentication.

In some applications, there may be an electrically conductive communications path 21' between the processor 19' and the processor 32'. This path permits wired communications between the processor 19' and the processor 32', and may be used for additional authentication of the removable power source 16'.

For example, the processor 32' may generate a challenge and a response, and then transmit the challenge to the processor 19' via the electrically conductive communications path 21'. The processor 19' generates a power source response and transmits the power source response to the processor 32' processor via the electrically conductive communications path 21'. The power source response may be generated based upon a cryptographic routine. The processor 32' authenticates the removable power source 16' based upon the power source response matching a stored response. For further details of this authentication via the electrically conductive communications path 21', see U.S. Pat. No. 7,697,957 to Pattenden et al., the contents of which are hereby incorporated by reference in their entirety.

Those elements not specifically discussed are similar to those of the mobile wireless communications device 10 of FIG. 1 as described above and require no further discussion herein.

Figure 3:
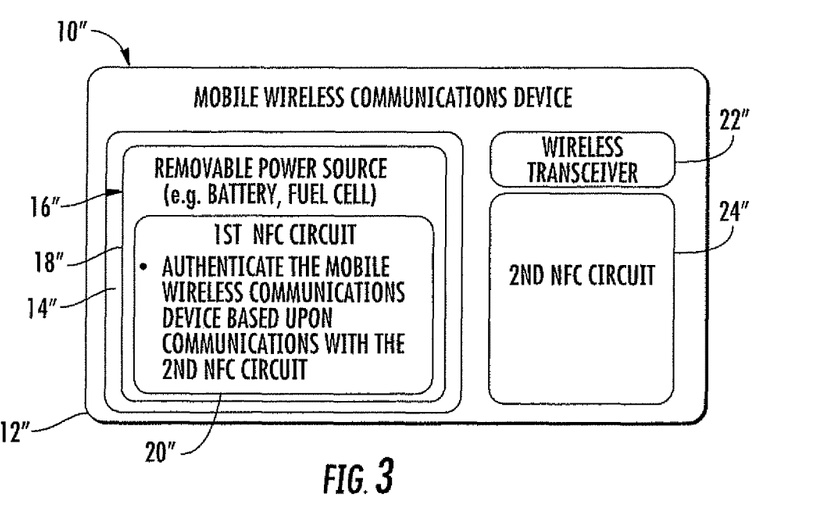
FIG. 3 is a schematic block diagram of a replaceable power source powering a mobile wireless communications device in accordance with the present disclosure.

With reference to FIG. 3, another embodiment of the mobile wireless communications device 10" is now described. Here, the first NFC circuit 20" is configured to authenticate the mobile wireless communications device 10" based upon communications with the second NFC circuit 24". That is, rather than the processor 32 determining authentication of the mobile wireless communications device 10" based upon communications between the first and second NFC circuits 20", 24", the first NFC circuit determines authentication of the mobile wireless communications device based upon communications between the first and second NFC circuits. The first NFC circuit 20" may then send notice of the authentication to the processor 32" of the mobile wireless communications device 10".

Various power saving features may optionally be implemented by the mobile wireless communications device 10 in example embodiments. For example, the second NFC circuit 24 may pulse or scan to detect the first NFC circuit 20 of the replaceable power source 16 for authentication, e.g., in an active NFC communication mode. If there is a match (i.e., authentication occurs), then there is no need for the second NFC circuit 24 to continue searching or scanning for power source authentication, and the first NFC circuit 20 may be powered down, or pulsing may occur at a lower frequency (e.g., to search for other NFC devices,) etc. For example, a relatively quick scan from the second NFC circuit 24 to detect the first NFC circuit 20 may be performed upon being powered up, etc. If there is a match (i.e., authentication), the second NFC circuit 24 may switch to a power saving mode (e.g., a passive NFC mode, less frequent pulses, pulses of shorter duration, etc.). If there is no authentication, the mobile wireless communications device 10 may be switched to the locked state (e.g., prevented from booting up upon being powered on), as described further above.

Figure 4:
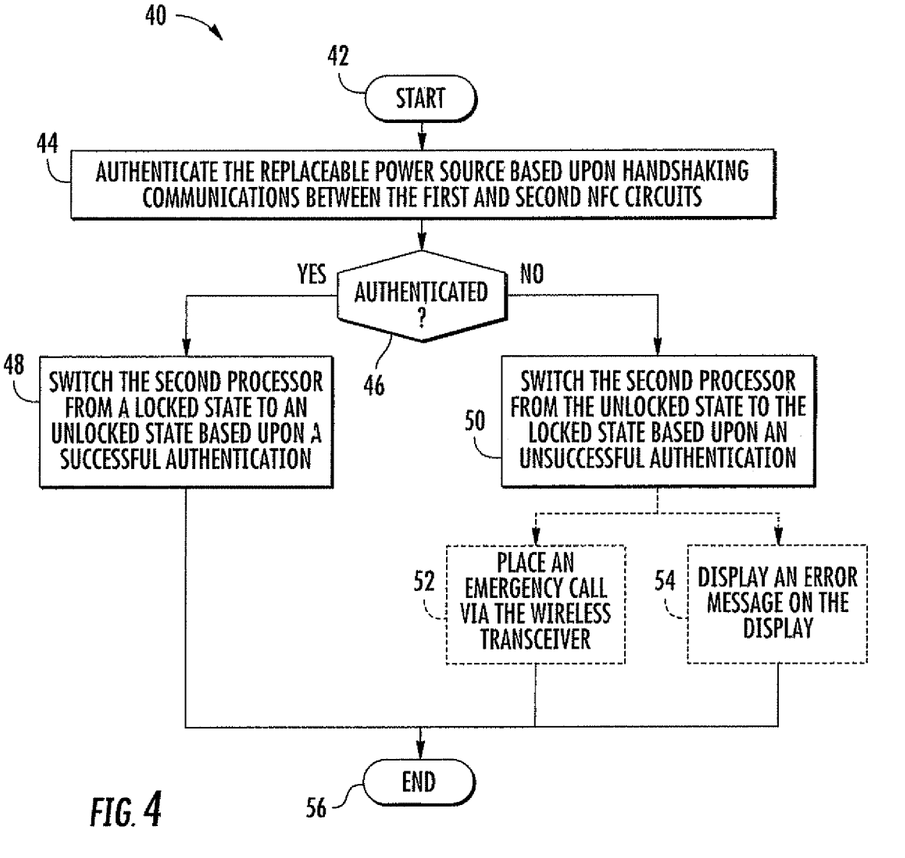
FIG. 4 is a flowchart of a method of operating a mobile wireless communications device in accordance with the present disclosure.

A method of operating the mobile wireless communications device 10 (of FIG. 1) is now described with reference to flowchart 40 of FIG. 4. After the start (Block 42), the processor 32 authenticates the removable power source 16 based upon handshaking communications between the first and second NFC circuits 20, 24 (Block 44). At Block 46, if the removable power source 16 has been authenticated, the processor 32 is switched from the locked state to the unlocked state (Block 48). If the removable power source 16 has not been authenticated at Block 46, the processor 32 is switched from the unlocked state to the locked state (Block 50). The processor 32 may then optionally place an emergency call via the wireless transceiver 22 (Block 52), or display an error message on the display (Block 54). Block 56 indicates the end of the method.

Example components of a mobile wireless communications device 1000 that may be used in accordance with the above-described embodiments are further described below with reference to FIG. 5. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 5:
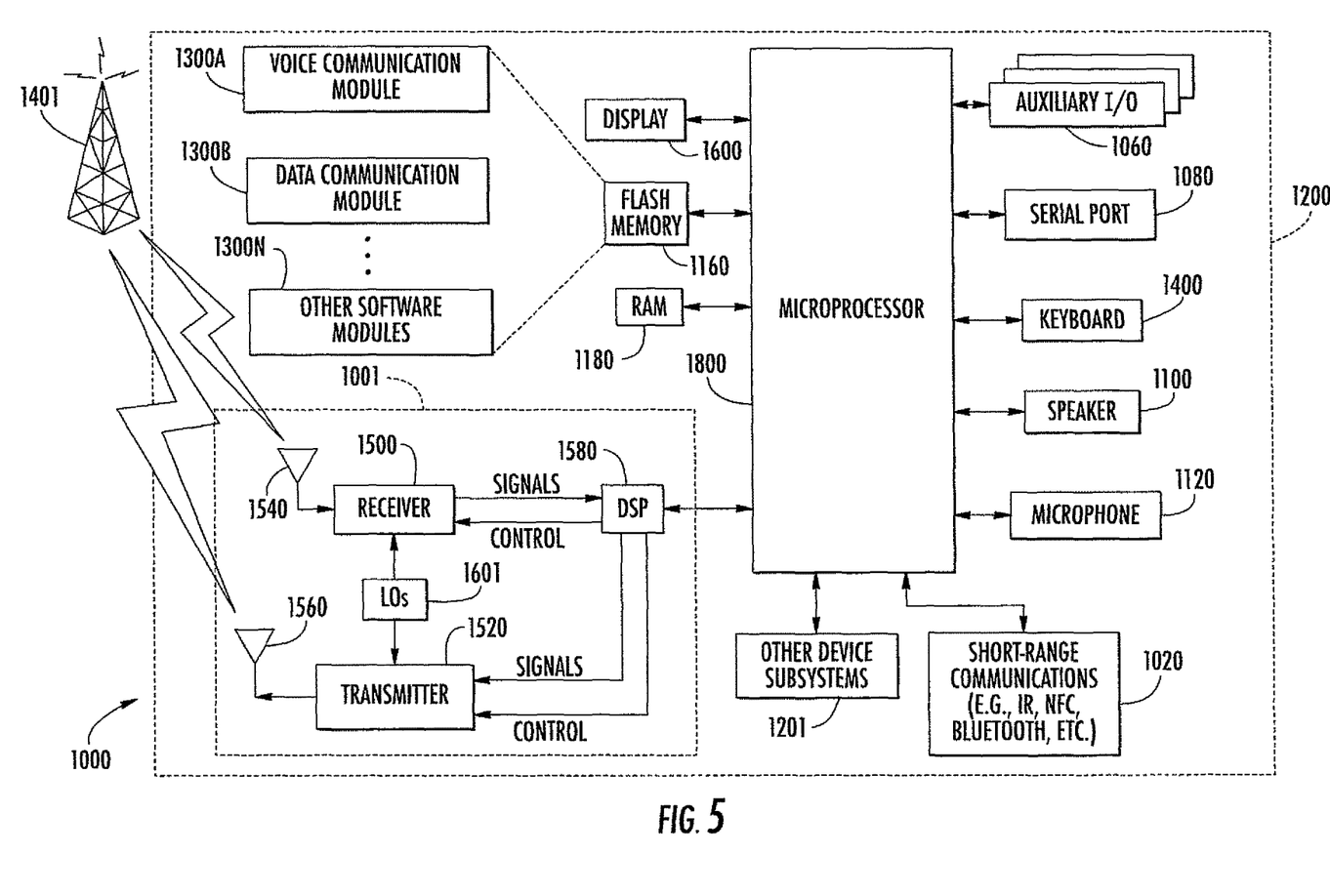
FIG. 5 is a high-level block diagram showing example embodiment additional components that can be used in the wireless communications device shown in FIG. 1.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
a housing;
a wireless transceiver carried by said housing;
a removable power source capable of being carried by said housing, said removable power source comprising a first Near Field Communications (NFC) circuit;
a second NFC circuit carried by said housing, said second NFC circuit being configured to authenticate said removable power source based upon communication with said first NFC circuit; and
a processor carried by said housing and coupled to said second NFC circuit, said processor being configured to switch from an unlocked state to a locked state based upon an unsuccessful authentication of said removable power source, said processor in the locked state receiving power from the removable power source and performing a subset of mobile device functions available when in the unlocked state.

2. The mobile wireless communications device of claim 1 wherein said processor is configured to switch from the locked state to the unlocked state based upon a successful authentication of said removable power source.

3. The mobile wireless communications device of claim 1 wherein the subset of mobile device functions comprises placing an emergency call.

4. The mobile wireless communications device of claim 1, further comprising a display carried by said housing; and wherein said processor is configured to cooperate with said display to display an error message when switched to the locked state.

5. The mobile wireless communications device of claim 1 wherein said processor is configured to exchange handshake communications with said removable power source.

6. The mobile wireless communications device of claim 5, wherein the handshake communications comprise a security code.

7. The mobile wireless communications device of claim 1, further comprising:
an NFC controller coupled to said first NFC circuit; and
an electrical conduction communication path between said NFC controller and said processor for additional authentication of said removable power source.

8. The mobile wireless communications device of claim 1, wherein said housing defines a cavity capable of receiving the removable power source; and wherein said removable power source is removably positioned within the cavity.

9. The mobile wireless communications device of claim 1, wherein said removable power source further comprises:
a sealed battery casing containing said first NFC circuit; and
at least one rechargeable battery cell carried by said sealed battery casing.

10. A mobile wireless communications device comprising:
a housing defining a cavity capable of receiving a removable power source;
a wireless transceiver carried by said housing;
a removable power source removably positioned within the cavity and comprising a first Near Field Communications (NFC) circuit;
a second NFC circuit carried by said housing and configured to authenticate said removable power source based upon communications with said first NFC circuit; and
a processor carried by said housing and coupled to said second NFC circuit;
said processor being configured to switch from a locked state to an unlocked state based upon a successful authentication of said removable power source, and to switch from the unlocked state to the locked state based upon an unsuccessful authentication of said removable power source, said processor in the locked state receiving power from the removable power source and performing a subset of mobile device functions available when in the unlocked state.

11. The mobile wireless communications device of claim 10, wherein the subset of mobile device functions comprises placing an emergency call.

12. The mobile wireless communications device of claim 10, further comprising a display carried by said housing; and wherein said processor is configured to cooperate with said display to display an error message when switched to the locked state.

13. A method on a mobile wireless communications device having a housing carrying a wireless transceiver and a removable power source, the removable power source comprising a first Near Field Communications (NFC) circuit, the method comprising:
authenticating the removable power source based upon communications between a second NFC circuit carried by the housing and the first NFC circuit; and
switching from an unlocked state to a locked state based upon an unsuccessful authentication of the removable power source, and when in the locked state performing a subset of mobile device functions available when in the unlocked state.

14. The method of claim 13, further comprising switching from the locked state to the unlocked state based upon a successful authentication of the removable power source.

15. The method of claim 13, wherein the subset of mobile device functions comprises placing an emergency call via the wireless transceiver.

16. The method claim 13, wherein the mobile wireless communications device further comprises a display, and further comprising displaying an error message on the display when in the locked state.

17. The method of claim 13, further comprising exchanging handshake communications with the removable power source.

* * * * *